Patented Oct. 12, 1943

2,331,677

UNITED STATES PATENT OFFICE 2,331,677

METHYLOL $\beta,\beta'$-IMINODIPROPIONIC ACID

Roy S. Hanslick, Philadelphia, Pa., assignor to American Cyanamid Company, New York, N. Y., a corporation of Maine No Drawing. Application October 27, 1942, Serial No. 463,552

1 Claim. (Cl. 260—534)

The present invention relates to methylol $\beta$, $\beta'$-iminodipropionic acid, a new compound which is of particular interest as an intermediate in the preparation of nitrogen-containing resins.

The following example, in which the parts are by weight, illustrates a specific method of preparing the above compound in accordance with the invention.

Example 161 parts of $\beta$, $\beta'$-iminodipropionic acid were added to 30 parts of formaldehyde (using a 37% formaldehyde solution). The clear solution was allowed to stand several hours at room temperature. The crystalline product, methylol $\beta$, $\beta'$-iminodipropionic acid, was filtered off and dried. The compound was obtained as a white finely crystalline material melting at 183°–184° C.

While the invention has been described with particular reference to specific embodiments it is to be understood that it is not to be limited thereto but is to be construed broadly and restricted solely by the scope of the appended claim.

I claim:

Methylol $\beta$, $\beta'$-iminodipropionic acid.

ROY S. HANSLICK.